United States Patent [19]
Takayama et al.

[11] Patent Number: 5,335,189
[45] Date of Patent: Aug. 2, 1994

[54] ROTATION PHASE CONTROL DEVICE

[75] Inventors: Nobutoshi Takayama, Kanagawa; Takashi Kobayashi; Toshiaki Mabuchi, both of Tokyo; Koji Takahashi, Kanagawa, all of Japan

[73] Assignee: Canon Kabushiki Kaisha, Tokyo, Japan

[21] Appl. No.: 893,564

[22] Filed: Jun. 3, 1992

Related U.S. Application Data

[63] Continuation of Ser. No. 465,466, Jan. 16, 1990, abandoned.

[30] Foreign Application Priority Data

Jan. 21, 1989 [JP] Japan .................................. 1-12513
Jan. 24, 1989 [JP] Japan .................................. 1-14351

[51] Int. Cl.$^5$ .................................................. H02P 5/06
[52] U.S. Cl. .................................. 364/565; 364/571.01; 318/85; 388/813
[58] Field of Search .............. 364/559, 565, 571.01, 364/572, 724.01, 724.02, 724.06, 724.19; 388/812, 813, 814, 820, 902, 911; 318/85, 445, 448, 452; 360/73.01, 73.03, 74.1; 361/85

[56] References Cited

U.S. PATENT DOCUMENTS

| | | | |
|---|---|---|---|
| 3,934,269 | 1/1976 | Fujita et al. | 388/812 |
| 4,517,501 | 5/1985 | Takimoto | 318/445 |
| 4,543,516 | 9/1985 | Kobori et al. | 388/813 |
| 4,595,868 | 6/1986 | Louth | 388/812 |
| 4,639,649 | 1/1987 | Seto | 318/448 |
| 4,695,778 | 9/1987 | Chito et al. | 318/85 |
| 4,841,461 | 6/1989 | Yamamoto et al. | 364/571.01 |
| 4,864,200 | 9/1989 | Kohsaka | 388/812 |
| 4,885,793 | 12/1989 | Tabuchi | 360/73.01 |
| 4,902,949 | 2/1990 | Hirata | 318/608 |
| 4,933,985 | 6/1990 | Fukushima | 388/813 |

Primary Examiner—Thomas G. Black
Assistant Examiner—Michael Zanelli
Attorney, Agent, or Firm—Robin, Blecker, Daley & Driscoll

[57] ABSTRACT

In a rotation phase control device which forms phase control information by carrying out at least an integrating process on phase error information obtained according to a phase difference between a rotation phase detection signal indicating the rotation phase of a rotary body and a reference signal, the phase control information is temporarily invalidated when the phase difference becomes a value within a given range.

19 Claims, 6 Drawing Sheets

ROTATION PHASE CONTROL DEVICE

This is a continuation application under 37 CFR 1.62 of prior application Ser. No. 465,466, filed Jan. 16, 1990, now abandoned.

BACKGROUND OF THE INVENTION

1. Field of the Invention

This invention relates to a rotation phase control device and more particularly to a device for controlling a rotation phase by carrying out at least an integrating process on phase error information.

2. Description of the Related Art

In arranging a rotation phase control device to control the rotation phase of a rotary body for rotating it in synchronism with a given reference phase, it has generally been practiced to arrange, in combination with the rotation phase control device, a rotation speed control device for controlling a rotation speed on the basis of rotation speed information obtained from the rotary body. More specifically, while the rotary body is allowed to rotate at a speed close to a desired rotation speed under the control of the rotation speed control device, a phase difference between the rotation phase information obtained from the rotary body and the reference phase information is detected. Then, the rotation phase is controlled according to a phase error signal which is formed on the basis of information on the phase difference detected.

For stronger and stabler phase control, the rotation phase control device is generally provided with a phase compensating circuit which acts mainly as an integrating circuit. The above-stated phase error signal is supplied as a phase control signal via this phase compensating circuit to a rotary body driving system.

However, the integrating time constant of the phase compensating circuit is sometimes set at a relatively large value. In that case, the stability of the device in a normal operating state increases. However, with regard to the response characteristic of the device in a transient state, its control locking-in time becomes long.

In cases where the mixing ratio of the phase control signal to the speed control signal is increased for stronger phase control, the rotation phase approaches to the desired phase often after over-shooting. In some extreme cases, it brings about hunting, thus resulting in an excessively long locking-in time.

SUMMARY OF THE INVENTION

It is a general object of this invention to solve the above-stated problem of the prior art.

It is a more specific object of the invention to provide a rotation phase control device which is capable of bringing the rotation phase of a rotary body to a desired phase in a short period of time.

Under this object, a rotation phase control device which is arranged as an embodiment of this invention to carry out at least an integrating process on phase error information obtained according to a phase difference between a phase detection signal indicating the rotation phase of a rotary body and a reference phase signal to produce phase control information includes means for temporarily invalidating the above-stated phase control information when the phase difference enters a predetermined range.

The above and other objects and features of the invention will become apparent from the following detailed description of embodiments thereof taken in connection with the accompanying drawings.

DETAILED DESCRIPTION OF THE PREFERRED EMBODIMENTS

Figure 1:
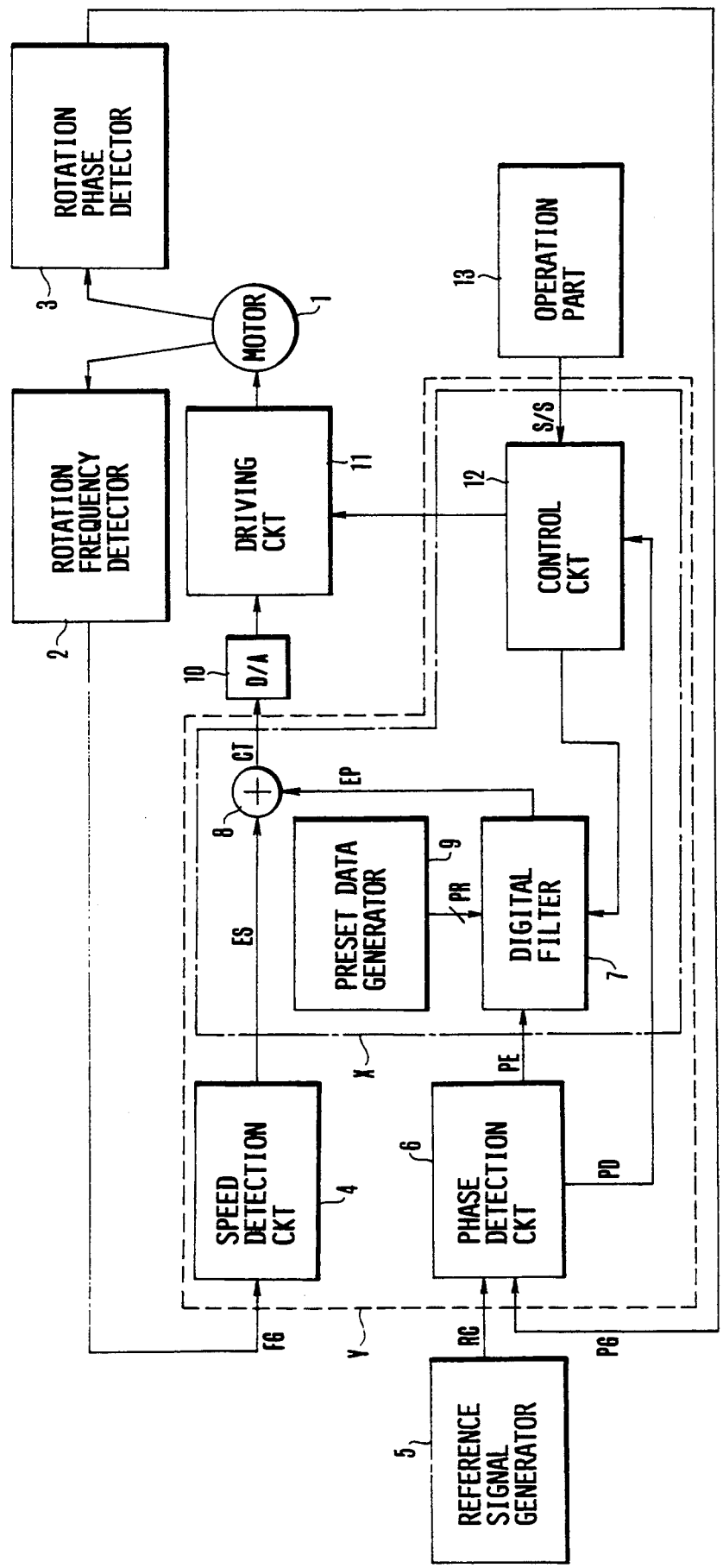
FIG. 1 is a block diagram showing the arrangement of a rotary cylinder control system of a VTR to which this invention is applied as an embodiment thereof.
Figure 2:
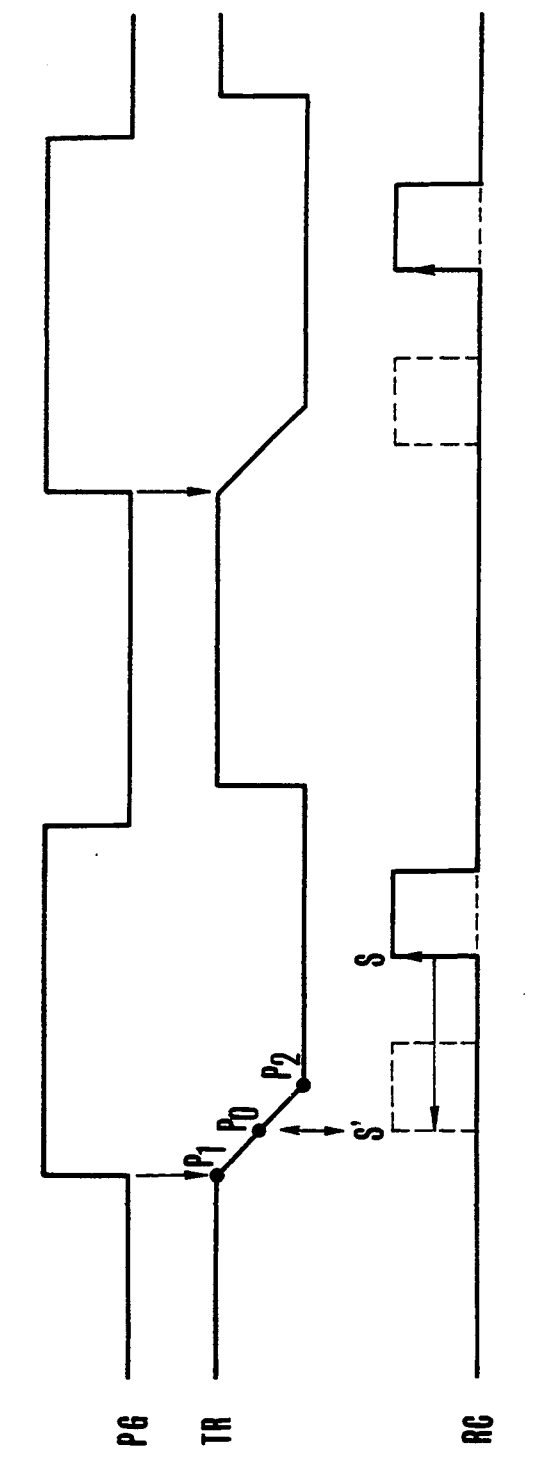
FIG. 2 is a time chart showing the operation of the control system of FIG. 1.

The following describes the embodiments of this invention with reference to the accompanying drawings, wherein: FIG. 1 shows the arrangement of a rotary cylinder control system of a VTR which is arranged according to this invention as an embodiment thereof. FIG. 2 shows in a time chart the operation of the arrangement shown in FIG. 1.

Referring to FIG. 1, a drum motor 1 is arranged to drive and rotate the rotary upper cylinder of the VTR. A rotation frequency detector 2 is arranged to generate a speed detection pulse signal FG of a frequency which is proportional to the rotating speed of the drum motor 1. A rotation phase detector 3 is arranged to generate a pulse signal PG which indicates the rotation phase of the drum motor 1. A speed detection circuit 4 is arranged to produce speed control information ES which is proportional to a difference between a desired (target) speed and a rotation speed of the drum motor 1 indicated by the pulse signal FG. A reference signal generator 5 is arranged to generate a reference signal RC which indicates a reference phase. A phase detection circuit 6 is arranged to produce phase difference information PD which indicates a phase difference between the reference signal RC and the pulse signal PG and also phase error information PE which corresponds to the phase difference. A digital filter 7 is arranged to act as a phase compensating circuit. An adder 8 is arranged to form rotation control information CT by adding together phase control information EP output from the digital filter 7 and the above-stated speed control information ES and to form a rotation control information CT. A preset data generator 9 is arranged to generate preset data PR for presetting each delaying branch ($Z^{-1}$ data) of the digital filter 7. A D/A converter 10 is arranged to digital-to-analog convert the rotation control information CT. A driving circuit 11 is arranged to drive the drum motor 1. A control circuit 12 is arranged to control the operation of the driving circuit 11 and a presetting action on the digital filter 7. A reference numeral 13 denotes an operation part provided on the VTR.

Referring to FIG. 2 which is a time chart showing the operation of the phase detection circuit 6, the circuit 6 is arranged to generate digital data TR corresponding to a trapezoidal wave as shown at a part TR in FIG. 2 by using the pulse signal PG. This data TR is sampled at a rise time point S of the reference signal RC as shown in FIG. 2. The data TR thus sampled is used as the phase error information PE. The device performs phase control for the purpose of making a time point P0 at which the trapezoidal wave data TR becomes a predetermined value coinciding with the sampling time point S. Under this control, the point of time S approaches a point of time S'. The circuit 6 produces a time difference between the point P1 of the trapezoidal wave data TR and the point S of the reference signal RC as the phase difference information PD.

The embodiment operates as follows: In the initial stage of the operation, the drum motor 1 is in repose. The speed detection circuit 4 produces the speed control information ES at a larger value accordingly as the speed detection pulse signal FG has a longer period. Therefore, the value of the rotation control information CT also increases accordingly as that of the information ES increases. However, the control circuit 12 keeps the driving circuit 11 in a state of having no power supply. When an instruction is given from the operation part 13 for signal recording or reproduction by the VTR, the control circuit 12 allows the driving circuit 11 to have a power supply. Then, the drum motor 1 is driven according to the rotation control information CT.

After the start of the drum motor 1, the rotating speed of the motor 1 is accelerated. When it comes close to a desired rotational frequency, the phase control information EP acts to cause the phase of the reference signal RC relative to the pulse signal PG to shift from the phase indicated by a full line to another phase indicated by a broken line in FIG. 2. When the control circuit 12 judges through the phase difference information that the timing S of the reference signal RC has come to coincide with the timing P0 of the trapezoidal wave data TR, the data of each delaying branch of the digital filter 7 is preset by the control circuit 12 according to the preset data PR. In other words, the control circuit 12 supplies a pulse for loading the digital filter 7 with the preset data.

As a result of the above-stated action, the relative phase difference ceases to change in a state of having the timing S of the reference signal RC and the timing P0 of the trapezoidal wave data TR coinciding with each other. After that, phase control is finely performed with the output of the initialized digital filter 7.

In cases where the phase control is strongly performed by increasing the gain of the phase control information EP relative to the phase difference information PD, the arrangement of the embodiment described above promptly gives a phase control locking-in state. In addition to that, the phase control can be stably carried out as the digital filter 7 can be arranged to have a sufficiently large integrating time constant in the normal state.

After attainment of the normal state, the digital filter 7 is never initialized as long as the timing point S of the reference signal RC is between the timing points P1 and P2 of the trapezoidal wave data TR. However, in a case where the point S of the reference signal RC temporarily comes outside the range between the points P1 and P2 of the data TR and again comes to coincide with the timing point P0 of the data TR, the control circuit 12 detects it and initializes the digital filter 7.

The digital filter which is employed as the phase compensating circuit of the embodiment may be replaced with an analog filter which is arranged to permit its center voltage to be preset. In that instance, the phase error information PE is of course in the form of an analog signal. Further, in the embodiment described, the digital filter 7 may be arranged to be repeatedly initialized during the process of acceleration after the start of the drum motor 1. In that case, the phase control is virtually not performed during the acceleration period, so that the build-up time of the speed control system can be shortened.

Further, in the case of the embodiment, the digital filter is arranged to be initialized when the point S of the reference signal RC comes to coincide with the point P0 of the trapezoidal wave data TR. However, this arrangement may be changed to set a given range including the point P0 and to detect that the point S of the reference signal RC comes within this range. The inclination (data varying rate) of the trapezoidal wave data TR can be set as desired. The period between the points P1 and P2 also can be arbitrarily set.

The control information of the rotation control device which is arranged as described above can be processed by means of the software of a processor such as a microcomputer. In cases where the information processing characteristic is to be changed according to the state of rotation control by monitoring it like in the case of the embodiment described, the size of the hardware of the device tends to become larger. It is, therefore, advantageous to have a major portion of the control system covered by the software. For example, a part of the device of FIG. 1 indicated by a one-dot chain line X or a part indicated by a broken line Y may be replaced with a microcomputer and processed by the software thereof.

Figure 3:
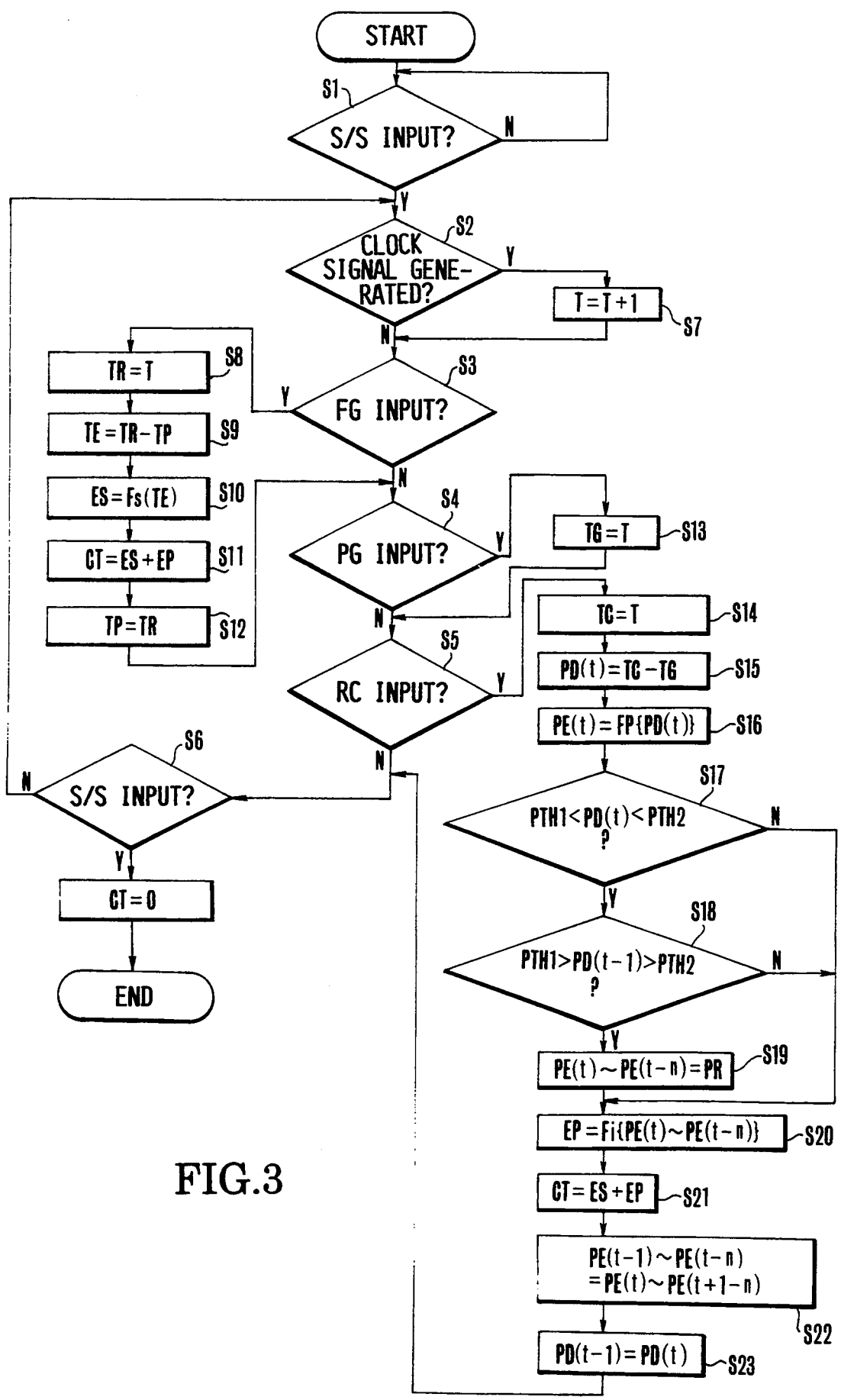
FIG. 3 is a flow chart showing the software processing operation of a microcomputer employed for a part of FIG. 1 encompassed with a broken line.

FIG. 3 is a flow chart showing the operation of a microcomputer which is used in place of the part of FIG. 1 encompassed with the broken line Y. Referring to FIG. 3, a start/stop signal S/S for recording or reproduction is received from the operation part 13 at a step S1. Steps S2 to S6: The flow of operation assumes a process stand-by state to wait for input of signals. Under this condition, time information T is renewed at a step S7 every time a clock pulse is generated within the microcomputer at the step S2. Every time the signal FG is received from the rotation frequency detector 2 at the step S3, the flow comes to steps S8 to S12. At the steps S8 to S12: After renewal of the speed control information ES, the output control information CT is also renewed. The following briefly describes this operation:

At the step S8: Information on the time T at which the signal FG is received is set at a variable TR which indicates the current input time of the signal FG. At the step S9: From the variable TR is subtracted the previous input time TP of the signal FG. A time difference thus obtained is set at time difference information TE. At the step S 10: Since the speed control information ES is obtainable as the function Fs of the time difference information TE, the information ES is set at the function Fs(TE). However, in a case where the process is to be performed for a speed control loop filter, the function Fs(TE) is accumulated for a given period of time as speed error information SE and the speed control information ES is obtained by performing a computing operation on the accumulated speed error information SE. At the step 11: The speed control information ES which is thus renewed and the phase control information EP are added together to renew the output control information CT. At the step S12: The current FG-input time data TR is set at the input time data TP as previous FG input time. After that, the flow comes back to the process stand-by state.

In the process stand-by state, when the rise edge of the signal PG is supplied from the rotation phase detector 3 at the step S4, the flow comes to a step S13. At the step S13: The variable TG is set at the time value T of this. When the rise edge of the reference signal RC is supplied from the reference signal generator 5 at the step S5, the flow comes to steps S14 to S23 to renew the phase control information EP and the output control information CT. This process is performed as follows:

At the step S14: The input time of the rise edge of the reference signal RC is set at a value TC. At the step S15: Current phase difference information PD(t) is obtained by subtracting the rise edge input time value TG from the time value TC. At the step S16: The information PD(t) is processed by a given function Fp to obtain current phase error information PE(t). The information PE(t) corresponds to the information which is supplied from the phase detection circuit 6 to the digital filter 7 in the case of the arrangement of FIG. 1.

At the steps S17 and S18: A discrimination is made between the necessity and non-necessity of initialization of the phase compensating process. A reference symbol PTH1 denotes a constant. Another constant PTH2 is larger than the constant PTH1. At the steps S17 and S18, a check is made to see if the current phase difference information PD(t) is between the constants PTH1 and PTH2 and, at the same time, if the previous phase difference information PD(t−1) is not between these constants. In other words, a range which is close to the desired phase difference information PX is assumed to be between the constants PTH1 and PTH2 and the check is made to see if the phase difference has come within this range. Initialization of the phase compensating process effected when the phase difference is within this range gives the same degree of advantageous effect as in the case of the arrangement shown in FIG. 1.

If the results of the checks made at the steps S17 and S18 are in the affirmative, the flow comes to a step S19. The preset data PR is set according to the previous phase error information values PE(t−1) to PE(t−n) obtained an "n" number of times in the past and the current phase error information value PE(t). In the phase compensating process, a function Fi is used for these values. At a step S20: Therefore, the phase control information EP is renewed by computing EP=Fi{(-PE(t) ~PE(t−n)}. In this instance, if the values PE(t) to PE(t−n) coincide with the preset data PR, the phase compensating process is initialized.

At a next step S21: The speed control information ES is added to the renewed phase control information EP to renew the output control information CT. At a step S22: The values PE(t) to PE(t+1−n) are shifted (decremented) by one respectively to set them at values PE(t−1) to PE(t−n). At a step S23: The phase difference PD(t) is set at PD(t−1) and the flow comes back to the process stand-by state. When the signal S/S for stopping the recording or reproducing operation is supplied at the step S6 from the operation part 13 while the microcomputer is in the process stand-by state, the output control information CT is immediately set at "0" and the motor 1 is brought to a stop.

The software processing arrangement which uses the microcomputer as described above also give the same advantageous effect as in the case of the device which is arranged as shown in FIG. 1.

Each of the embodiments described in the foregoing is capable of strongly applying phase control, promptly giving a control locking-in state and stably carrying out the rotation phase control operation.

Figure 4:
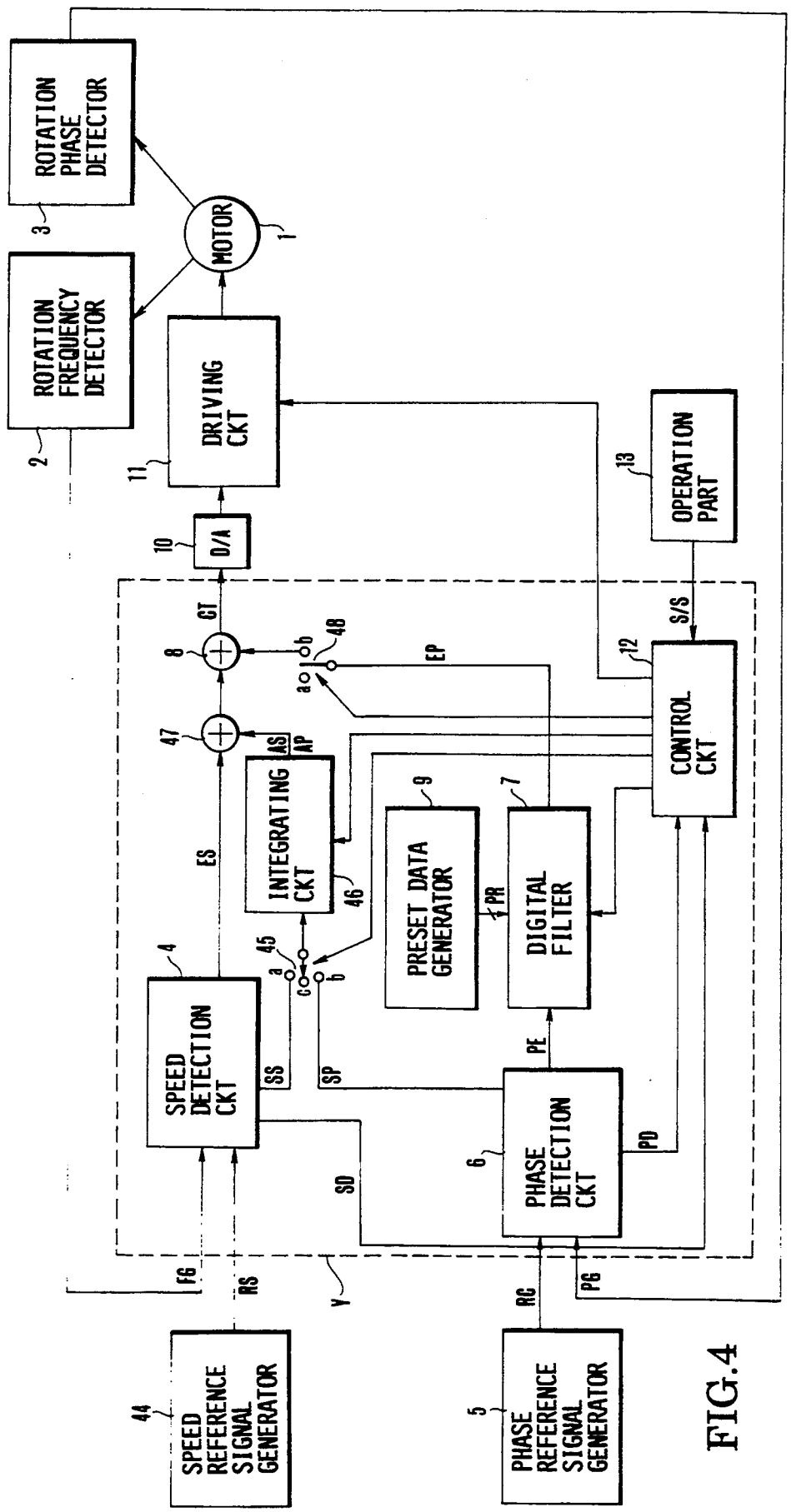
FIG. 4 shows the arrangement of a rotary cylinder control system of a VTR which is arranged according to this invention as another embodiment thereof.
Figure 5:
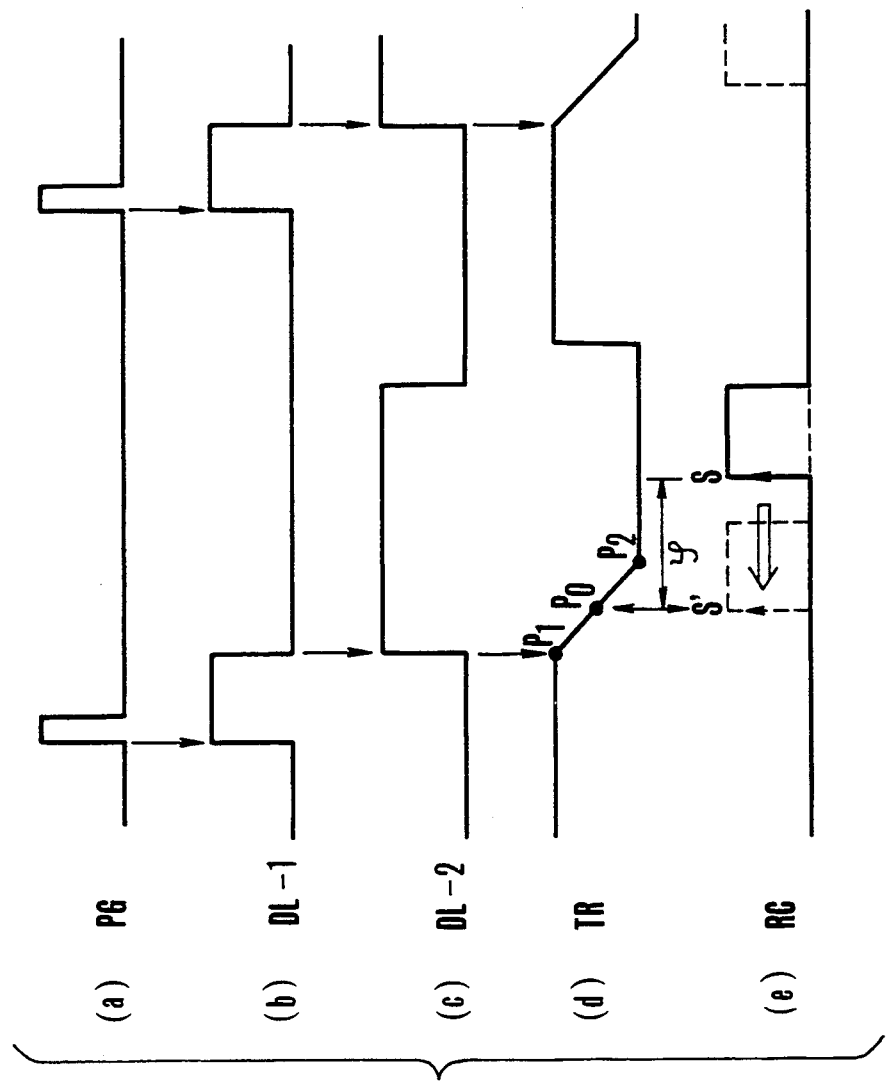
FIG. 5 is a time chart showing the operation of the embodiment shown in FIG. 4.

FIG. 4 shows the rotary cylinder control system of a VTR arranged according to this invention as another embodiment thereof. FIG. 5 is a time chart showing the operation of the arrangement shown in FIG. 4.

In FIG. 4, the same component parts as those of FIG. 1 are indicated by the same reference numerals and symbols, and the details of them are omitted from the following description. The illustration includes a speed reference signal generator 44 which is arranged to generate a speed reference signal RS of a frequency corresponding to a desired (or target) rotation speed. The speed detection circuit 4 is arranged to generate a speed difference information SS indicating a difference between the rotating speed of the motor 1 and the desired speed. The control circuit 12 is arranged to control the operations of the driving circuit 11, the digital filter 7, the integrating circuit 46 and the switches 45 and 48.

The speed detection circuit 4 is arranged to generate speed state information SS indicating the highness or lowness of the rotation speed of the drum motor 1 as in comparison with the above-stated desired speed. The information SS becomes "−1" when the rotation speed of the drum motor 1 is higher than the desired speed and "+1" when the rotation speed is lower than the desired speed. The phase detection circuit 6 is arranged to generate phase state information SP. The information SP likewise becomes "+1" when the phase of the signal PG is ahead of a reference phase and "−1" when it is behind the reference phase. The switch 45 has three terminals "a" "b" and "c". The switch 45 is selectively connected to one of these terminals to produce the speed state information SS or the phase state information SP. A reference numeral 46 denotes an integrating circuit. A numeral 47 denotes an adder. The switch 48 is selectively connected to its terminal "a" or "b" and is arranged to supply or not to supply the phase control information EP to the adder 8.

FIG. 5 is a time chart showing the operation of the phase detection circuit 6 of FIG. 4. The operation of the embodiment is as described below with reference to these drawings:

The drum motor 1 is in repose in the initial stage of the operation. Since the speed detection circuit 4 is arranged to increase the value of the speed control information ES accordingly as the period of the signal increases, the value of the rotation control information CT has become large according to the information ES. However, the control circuit 12 keeps the driving circuit 11 in a state of having no power supply. Further, at this time, the control circuit 12 connects the switch 45 to its terminal "c" and the switch 48 to its terminal "a"; resets the integrating circuit 46; and presets the data of each delaying branch of the digital filter 7 with the preset data PR.

When an instruction for signal recording or reproduction with the VTR is given from the operation part 13 under this condition, the control circuit 12 permits a power supply to the driving circuit 11. After that, the drum motor 1 is driven in accordance with the rotation control information CT.

After the start of the drum motor 1, the absolute value of the speed difference information SD becomes lower than a given value TH1 with the speed of the motor 1 accelerated to come close to a desired (or target) speed. Upon detection of this, the control circuit 12 shifts the connecting position of the switch 45 to its terminal "a". As a result, the speed state information SS is supplied to the integrating circuit 46. The output of the integrating circuit 46 is supplied as speed correction information AS to the adder 47. The information AS serves to more accurately bring the rotation speed of the motor 1 to the desired speed.

Following this, when it is detected that the absolute value of the speed difference information SD becomes less than a give value TH2 (which is less than the given value TH1) with the rotation speed of the drum motor 1 having come closer to the desired speed, the control circuit 12 connects the switches 45 and 48 to their terminals "b".As a result the integrating circuit 46 is reset and the digital filter 7 preset. This allows the phase control information EP to be supplied to the adder 8. The phase of the phase reference signal RC is then shifted relative to the signal PG from the phase indicated by the full line in FIG. 5 to the phase indicated by the broken line in accordance with the phase control information EP. Further, the phase state information SP is supplied to the integrating circuit 46. The output of the integrating circuit 46 is then supplied as phase correction information AP to the adder 47. This serves to cause the rotation phase of the motor 1 to accurately coincide with the desired phase.

Assuming that a phase difference existed between the signal PG and the desired (target) phase is $\phi$, the phase difference $\phi$ is lessened by changing the rotation speed to deviate from the target speed under the phase control. The phase difference varying speed increases and the period of time required for the shift from the point S to the point S' becomes shorter accordingly as the degree of the above-stated change (an offset degree) is larger. However, as mentioned in the foregoing, this offset degree is determined by the ratio between the speed control information ES and the phase control information EP. If the offset degree is excessively large, that is, if the phase control is too strong, the point S would probably overshoot the point S'.

This problem is solved in the following manner: When the point S comes between the points P1 and P2 thus indicating that the absolute value of the phase difference information PD becomes less than a given value TH3, this is detected by the control circuit 12. The control circuit 12 then temporarily connects the switch 48 to its terminal "a" to reset the integrating circuit 46 and also connects the switch 45 to its terminal "a" to readjust the speed. By this, the rotation phase of the motor 1 which is rapidly approaching to the target phase can be brought to a stop at a point close to the target, so that the degree of overshooting can be lessened.

When the absolute value of the speed error information SD becomes less than the given value TH2 with the rotation speed of the motor 1 thus again becoming close to the target speed, the control circuit 12 again presets the digital filter 7 and also resets the integrating circuit 46. Then, the phase control is performed with the switches 45 and 48 connected to their terminals "b". This arrangement thus enables the device to speedily attain a stable phase controlling state.

In accordance with the arrangement of the embodiment described, even if the phase control is strongly applied by increasing the gain of the phase control information EP relative to the phase difference information PD, a phase control locking-in state can be promptly obtained without the fear of hunting or the like. Besides, since the digital filter 7 can be arranged to have a sufficiently large integrating time constant under a normal operating condition, the phase control can be stably carried out.

Further, by virtue of the action of the integrating circuit 46, the rotation control information CT varies until the rotation phase of the motor 1 perfectly coincides with the desired phase. Therefore, the rotation phase of the motor can be brought into a state of perfectly coinciding with the desired phase.

After attainment of a stable state of rotation phase control, the phase control never becomes inoperative. However, in the event of a phase deviation to a degree exceeding a given allowable degree due to some disturbance, the control can be brought into the normal state through the same process as described above, so that the phase control can be promptly locked in.

The control information of the rotation control device which is arranged as described above can be processed by means of the software of a processor such as microcomputer. Especially, in the case of a device wherein the information processing characteristic must be varied while the state of rotation control is kept monitored like in the case of the embodiment described, it is advantageous to process a major portion of the control system operation by software means, because the hardware arrangement of the device tends to become large.

Figure 6:
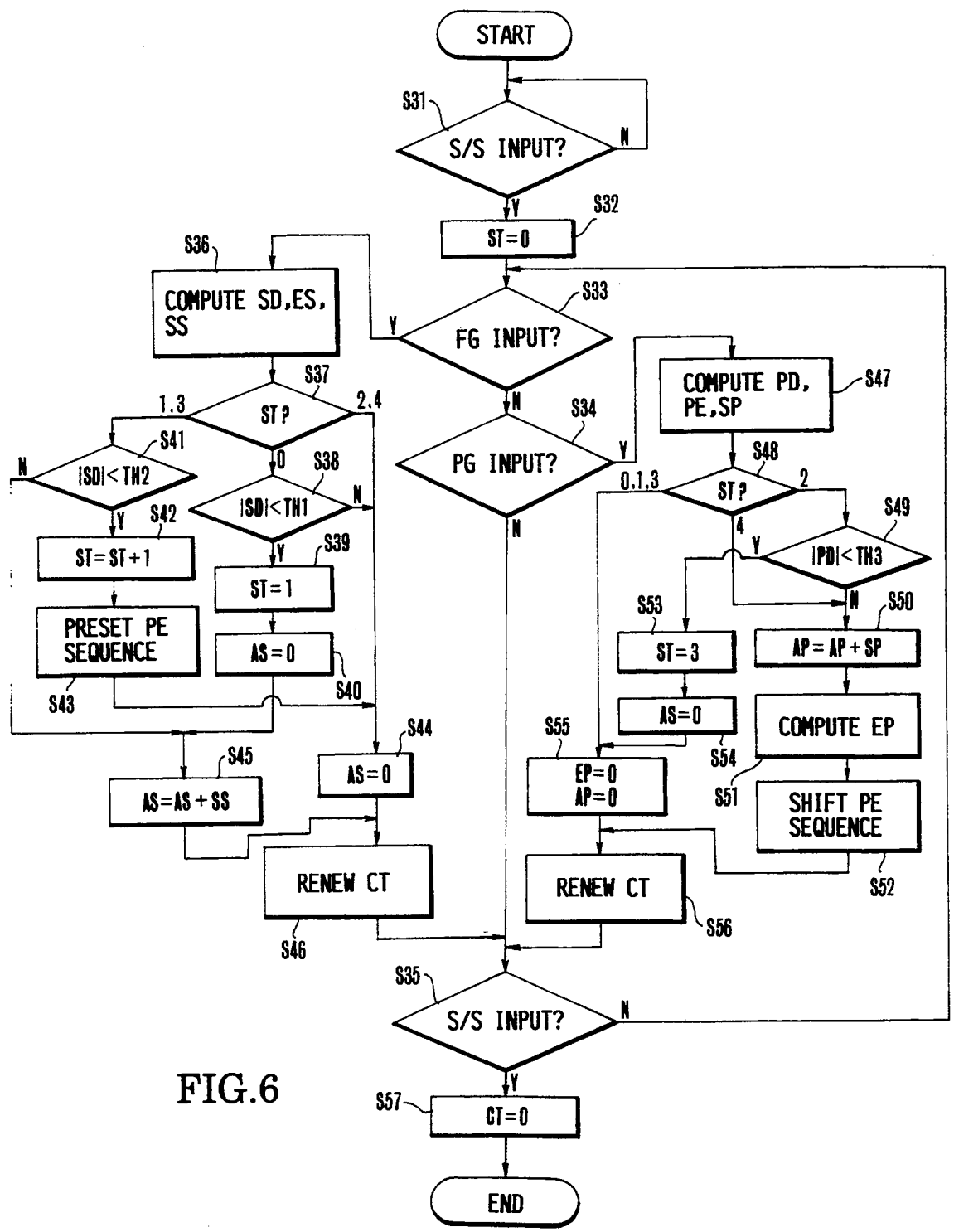
FIG. 6 is a flow chart showing the software processing operation of a microcomputer employed for a part of FIG. 4 encompassed with a broken line.

FIG. 6 is a flow chart showing the operation of a microcomputer which is employed in place of the part of FIG. 4 encompassed with a broken line Y. The flow of operation of the microcomputer is programmed as follows:

At a step S31: An instruction signal S/S for the start or stop of recording or reproduction is supplied from the operation part 13 to the microcomputer. At a step S32: A variable ST is set at "0". The flow comes to stand-by steps S33 to S35 to wait for the supply of signals. The above-stated variable ST indicates the various states of the control circuit from an initial state to a normal state and is arranged to vary from "0" to "4".

At the step S33, a check is made for the supply of the signal FG in the stand-by state. Upon receipt of the signal FG, the speed control information ES and the speed correction information AS are renewed. At the step S34, a check is made for the supply of the signal PG. Upon receipt of the signal PG, the phase control information EP and the phase correction information AP are renewed. After renewal of these signals, the output control information CT is computed and obtained as the sum of the information values ES, EP, AS and AP and is thus renewed at steps S46 and S56 respectively.

The more detailed description of the operation is as follows: Upon receipt of the signal FG at the step S33, the flow comes to a step S36. At the step S36: An input time difference TE between the current FG input and the preceding FG input is computed. Meanwhile, the time difference XE of the speed .reference signal RS is also computed. The results of the computation show the periods of the signals FG and RS respectively. The speed difference information SD is obtainable by the function Fa(TE, XE) of them. The speed control information ES is obtainable by the function Fs(SD) of the speed difference information SD. The speed state information SS is obtainable by the plus or minus sign of the speed difference information SD. However, in a case where a process corresponding to a loop filter for speed control is to be performed, the speed error information SE based on the speed difference information SD is accumulated over a given period of time and the speed control information ES is obtained from the information thus accumulated. In a case where the variable ST is "0" the flow comes via a step S37 to a step S38. At the step S38: A check is continuously made to see if the absolute value |SD| of the speed difference information is less than the given value TH1.

The value |SD| is larger than the given value TH1 until the rotation speed comes close to the target speed. During this time, the speed correction information AS remains at "0" (step S44). The output control information CT then reflects only the renewal of the speed control information ES.

Meanwhile, upon arrival of the signal PG at the step S34, the flow comes to a step S47. A difference ZE between the input time of the signal PG and that of the phase reference signal RP immediately preceding the PG, input is computed. If the difference ZE thus obtained is equal to or less than ½ RP compared with the time difference RE of the adjacent input of the phase reference signal RP, the phase difference information PD is set at a value RP−ZE. Further, the phase error information PE is obtainable by the function $F_p(PD)$ of the phase difference information PD and the phase state information SP by the plus or minus sign of the information PD.

At a step S48: The variable ST is checked for its state. Since the variable ST remains at "0" until the rotation speed comes close to the target speed, if the variable ST is found to be "0", the flow comes to a step S55. At the step S55: The phase control information EP and the phase correction information AP are set at "0" respectively. Then, at a step S56, the output control information CT is not renewed.

When the rotation speed of the motor 1 comes close to the target speed and the value |SD| is determined to be less than the given value TH1 at the step S38, the flow comes to a step S39 to set the variable ST at "1". At a step S40: The speed correction information AS is reset and, after that, the flow comes to a step S45 to integrate the speed state information SS for the speed correction information AS. In the case of ST=1, the flow comes from the step S41 to the step S45 as mentioned above. In that case, the speed control information ES and the speed correction information AS are renewed one after another. This brings the rotation speed of the motor 1 closer to the target speed.

With the rotation speed of the motor 1 further approaching the target speed under the condition of ST =1, when the value |SD| is found to have become smaller than another given value TH2 at the step S41, the flow comes to a step S42 to set the variable ST at "2". At a step S43: All the phase error information PE which has been accumulated over a given period of time is replaced with the preset data PR. At a step S44: The speed correction information AS is set at "0" and the speed control information ES is solely renewed.

Meanwhile, under the condition of ST=2, the flow comes from the step S48 via a step S49 to a step S50. At the step 50: The phase state information SP is added to the phase correction information AP in an integrating manner. At a step S51: A computing operation which corresponds to the action of the digital filter 7 of FIG. 4 is performed on the phase error information PE(t) −PE(t−n) which is obtained over a given period of time. The phase control information EP is obtained from this. At a step S52: The phase control information PE(t)−PE(t−n) is shifted to PE(t−1)−PE(t−n−1) to obtain new phase control information EP. The flow then comes to a step S56. At the step S56: The output control information CT is renewed according to the new phase control information EP and the phase correction information AP. The phase control is executed accordingly.

When the rotation phase comes to approximately coincide with the target phase under the condition of the variable ST=2, the absolute value |PD| of the phase difference information becomes less than the smaller given value TH3. This is found at the step S49. The flow comes to a step S53 to set the variable ST at "3". At a step S54: The speed correction information AS is reset. The flow then comes to a step S55 to reset both the phase control information EP and the phase correction information AP at "0". Then, the speed control and speed correction are alone performed in the same manner as when the variable ST is at "1".

In a case where the absolute value of the speed difference information is found at the step S41 to have again become a value less than the given value TH2 under the condition of ST=3, the flow comes to a step S42. At the step S42: The variable ST is set at "4". The flow then comes to a step S43 to preset the sequence of phase error information values PE(t) to PE(t−n) for a given period of time. The phase control and phase correction are then carried out like in the case of ST=2.

When an instruction signal S/S is received from the operation part 13 for bringing the recording or reproducing operation to a stop while the flow of the program is at the stand-by step S35, the output control information CT is immediately set at "0" to bring the rotation of the motor to a stop.

The software process which is performed with a microcomputer in the above-stated manner gives the same advantageous effect as the device of FIG. 4.

As described in the foregoing, the rotation phase control device according to this invention is capable of promptly obtaining a control locking-in state even when the phase control is strongly applied. The device is also capable of stably operating in its normal operating state.

What is claimed is:

1. A rotation phase control device comprising:
  a) phase control means for controlling a rotation phase of a rotary body to adjust the rotation phase to a reference phase, said phase control means including phase compensation means for performing at least an integrating process on phase error information according to a phase difference between said rotation phase and said reference phase;
  b) phase judging means for judging a phase difference between said rotation phase and said reference phase to be within or not within a predetermined range; and
  c) resetting means for resetting the integrating process of said phase compensation means in response to a judgment of said phase judging means indicating that said phase difference has entered said predetermined range.

2. A device according to claim 1, wherein said phase control means, said phase judging means and said resetting means are embodied by processes executed within a single processor.

3. A rotation phase control device comprising:

a) phase detecting means for generating a phase detection signal indicating a rotation phase of a rotary body;

b) phase reference signal generating means for generating a phase reference signal;

c) phase error detecting means for producing phase error information according to a phase difference between said phase detection signal and said phase reference signal;

d) phase compensating means for performing at least an integrating process on said phase error information to produce phase control information;

e) rotation phase control means for controlling the rotation phase of said rotary body on the basis of said phase control information;

f) phase judging means for judging said phase difference to be or not to be within a predetermined range; and g) resetting means for resetting the integrating process of said phase compensating means in response to a judgment of said phase judging means indicating that said phase difference has entered said predetermined range.

4. A device according to claim 3, wherein said phase error detecting means is arranged to produce said phase error information in a digitized form.

5. A device according to claim 4, wherein said phase compensating means includes a digital filter which has a plurality of delay branch outputs, and wherein said resetting means is arranged to preset each of said delay branch outputs of said digital filter.

6. A rotation phase control device, comprising:

a) phase detecting means for generating a phase detection signal indicating a rotation phase of a rotary body;

b) phase reference signal generating means for generating a phase reference signal;

c) phase error detecting means for producing phase error information according to a phase difference between said phase detection signal and said phase reference signal;

d) rotation phase control means for controlling the rotation phase of said rotary body by using said phase error information;

e) phase judging means for judging said phase difference to be or not to be within a predetermined range;

f) prohibiting ;means for prohibiting an operation of controlling the rotation phase performed by said rotation phase control means in response to a judgment of said phase judging means indicating that said phase difference has entered said predetermined range;

g) speed detecting means for generating a speed detection signal indication a rotation speed of said rotary body;

h) speed reference signal generating means for generating a speed reference signal;

i) speed error detecting means for producing speed error information according to a speed difference between said speed detection signal and said speed reference signal;

j) speed judging means for judging said speed difference to be within or not within a prescribed speed range; and k) renewing means for renewing the operation performed by said phase control means in response to a judgment of said speed judging means indicating that said speed difference has entered said prescribed speed range.

7. A device according to claim 6, wherein said rotation phase control means includes phase compensating means for performing at least an integrating process on said phase error information, and the device further comprises resetting means for resetting the integrating process of said phase compensating means, said resetting means being able to reset the integrating process while the phase control operation is discontinued by said prohibiting means.

8. A rotation phase control device comprising:

a) phase control means for controlling a rotation phase of a rotary body to adjust the rotation phase to a reference phase;

b) phase judging means for judging a phase difference between said rotation phase and said reference phase to be within or not within a predetermined range; and c) prohibiting means for prohibiting an operation of controlling the rotation phase performed by said phase control means in response to a judgment of said phase judging means indicating that said phase difference has entered said predetermined range;

d) speed control means for controlling a rotation speed of the rotary body to adjust the rotation speed to a reference speed;

e) speed judging means for judging a speed difference between said rotation speed and said reference speed to be within or not with a prescribed speed range; and f) renewing means for renewing the operation performed by said phase control means in response to a judgment of said speed judging means indicating that said speed difference has entered 'said prescribed range.

9. A rotation phase control device comprising:

a) phase control means for controlling a rotation phase of a rotary body to adjust said rotation phase to a reference phase;

b) speed control means for controlling a rotation speed of said rotary body to adjust said rotation speed to a reference speed;

c) phase judging means for judging a phase difference between said rotation phase and said reference phase to be or not to be within a predetermined range;

d) speed judging means for judging a speed difference between said rotation speed and said reference speed to be or not to be within a prescribed speed range; and e) operation control means for prohibiting an operation of controlling the rotation phase performed by said phase control means in response to a judgment of said phase judging means indicating that said phase difference has entered said predetermined range, and for removing a prohibition of the operation performed by said phase control means in response to a judgment of said speed judging means indicating that said speed difference has entered said prescribed speed range.

10. A device according to claim 9, further comprising phase state detecting means for periodically generating phase state information which indicates whether or not the rotation phase of said rotary body is ahead of said reference phase; and phase correcting means for correcting the rotation phase of said rotary body by integrating an output of said phase state detecting means.

11. A device according to claim 10, wherein said operation control means is arranged to prohibit a correcting operation performed by said phase correcting means while the operation of controlling the rotation phase performed by said phase control means is prohibited.

12. A device according to claim 9, wherein said phase control means includes phase compensating means for performing at least an integrating process on phase error information which indicates a phase difference between said rotation phase and said reference phase, and resetting means for resetting the integrating process of said phase compensating means, and wherein said operation control means is arranged to allow said phase compensating means to reset the integrating process while the operation of controlling the rotation phase performed by said phase control means is prohibited.

13. A device according to claim 12, wherein said resetting means includes a digital filter which is arranged to receive digital information corresponding to said phase difference and has a plurality of delay branch outputs, and wherein said resetting means is arranged to preset each of the delay branch outputs of said digital filter.

14. A device according to claim 9, wherein said phase judging means, said speed judging means and said operation control means are embodied by processes executed within a single processor.

15. A rotation phase control device comprising:
a) phase control means for controlling a rotation phase of a rotary body to adjust said rotation phase to a reference phase;
b) phase state detecting means for periodically generating phase state information which indicates whether or not the rotation phase of said rotary body is ahead of said reference phase;
c) phase correcting means for correcting the rotation phase of said rotary body, said phase correcting means including integrating means which performs an integrating operation on an output of said phase state detecting means;
d) phase judging means for judging a phase difference between said rotation phase and said reference phase to be within or not within a predetermined range; and
e) resetting means for resetting the integrating operation performed by said integrating means in response to a judgment of said phase judging means indicating that said phase difference has entered within said predetermined range.

16. A device according to claim 15, further comprising operation control means arranged to prohibit an operation of controlling the rotation phase performed by said phase control means and wherein said resetting means is able to reset the integrating operation while the operation of controlling the rotation phase performed by said phase control means is prohibited.

17. A device according to claim 15, wherein said phase state detecting means, said phase correcting means, said phase judging means and said resetting means are embodied by processes executed within a single processor.

18. A rotation phase control device, comprising:
a) phase detecting means for generating a phase detection signal indicating a rotation phase of a rotary body;
b) phase reference signal generating means for generating a phase reference signal;
c) phase error detecting means for producing phase error information according to a phase difference between said phase detection signal and said phase reference signal;
d) rotation phase control means for controlling the rotation phase of said rotary body by using said phase error information;
e) phase judging means for judging said phase difference to be or not to be within a predetermined range;
f) prohibiting means for prohibiting an operation of controlling the rotation phase performed by said rotation phase control means in response to a judgment of said phase judging means indicating that said phase difference has entered said predetermined range;
g) speed detecting means for generating a speed detection signal indicating a rotation speed of said rotary body;
h) speed reference signal generating means for generating a speed reference signal;
i) speed error detecting means for producing speed error information according to a speed difference between said speed detection signal and said speed reference signal;
j) speed judging means for judging said speed difference to be within or not within a prescribed speed range; and
k) renewing means for renewing the operation performed by said phase control means in response to a judgment of said speed judging means indicating that said speed difference has entered said prescribed speed range,
said phase control means, said phase judging means and said prohibiting means being embodied by processes executed within a single processor.

19. A rotation phase control device comprising:
a) phase detecting means for generating a phase detection signal indicating a rotation phase of a rotary body;
b) phase reference signal generating means for generating a phase reference signal;
c) phase error detecting means for producing phase error information according to a phase difference between said phase detection signal and said phase reference signal;
d) rotation phase control means for controlling the rotation phase of said rotary body by using said phase error information;
e) phase judging means for judging said phase difference to be or not to be within a predetermined range;
f) prohibiting means for prohibiting an operation of controlling the rotation phase performed by said rotation phase control means in response to a judgment of said phase judging means indicating that said phase difference has entered said predetermined range, said phase control means, said phase judging means and said prohibiting means being embodied by processes executed within a single processor;
g) speed control means for effecting speed control of said rotary body; and
h) control means arranged to effect the speed control of said rotary body by said speed control means in the case where said prohibiting means prohibits the operation of controlling the rotation phase and to restart the operation of controlling the rotation phase when said rotary body becomes rotated at a predetermined rotation speed.

* * * * *

UNITED STATES PATENT AND TRADEMARK OFFICE
CERTIFICATE OF CORRECTION

PATENT NO. : 5,335,189
DATED      : August 2, 1994
INVENTOR(S): Nobutoshi Takayama et al.

It is certified that error appears in the above-identified patent and that said Letters Patent is hereby corrected as shown below:

Col. 7, line 11.  Change "give" to -- given --.

Col. 7, line 15.  After "result" insert -- , --.

Col. 7, line 51.  Delete "to".

Col. 9, line 21.  Delete ",".

Col. 11, line 48. Change "prohibiting.;means"
-- prohibiting means --.

Col. 11, line 55. Change "indication" to -- indicating --.

Signed and Sealed this

Tenth Day of January, 1995

Attest:

BRUCE LEHMAN

Attesting Officer     Commissioner of Patents and Trademarks